(12) United States Patent
Edvardsson

(10) Patent No.: US 7,701,385 B2
(45) Date of Patent: Apr. 20, 2010

(54) MULTI-CHANNEL RADAR LEVEL GAUGE SYSTEM

(75) Inventor: Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 12/125,192

(22) Filed: May 22, 2008

(65) Prior Publication Data

US 2009/0289835 A1 Nov. 26, 2009

(51) Int. Cl.
*G01S 13/08* (2006.01)
(52) U.S. Cl. ................................ 342/124; 342/175
(58) Field of Classification Search .............. 342/124, 342/175, 188
See application file for complete search history.

(56) References Cited

U.S. PATENT DOCUMENTS

| | | | | |
|---|---|---|---|---|
| 5,543,720 | A * | 8/1996 | Edvardsson | 324/643 |
| 5,614,831 | A * | 3/1997 | Edvardsson | 324/642 |
| 6,414,625 | B1 | 7/2002 | Kleman | 342/124 |
| 6,614,391 | B1 * | 9/2003 | Burger et al. | 342/124 |
| 6,915,689 | B2 * | 7/2005 | Edvardsson | 73/290 V |
| 6,950,055 | B2 * | 9/2005 | Edvardsson et al. | 342/124 |
| 7,068,213 | B2 * | 6/2006 | Muller et al. | 342/124 |
| 7,106,247 | B2 | 9/2006 | Edvardsson | 342/124 |
| 7,227,495 | B2 * | 6/2007 | Bletz et al. | 342/124 |
| 7,265,558 | B1 * | 9/2007 | Penndal et al. | 324/637 |
| 7,586,435 | B1 * | 9/2009 | Edvardsson | 342/124 |
| 2002/0135508 | A1 * | 9/2002 | Kleman | 342/124 |
| 2003/0168674 | A1 * | 9/2003 | Muller et al. | 257/200 |
| 2004/0099058 | A1 * | 5/2004 | Edvardsson | 73/290 V |
| 2005/0083229 | A1 * | 4/2005 | Edvardsson et al. | 342/124 |
| 2005/0264442 | A1 * | 12/2005 | Bletz et al. | 342/124 |
| 2007/0028829 | A1 * | 2/2007 | Griessbaum et al. | 114/343 |
| 2007/0222668 | A1 | 9/2007 | Schultheiss et al. | 342/124 |
| 2008/0074309 | A1 | 3/2008 | Nilsson | 342/124 |

FOREIGN PATENT DOCUMENTS

| WO | WO 03/025523 | 3/2003 |
|---|---|---|
| WO | WO 2004/018978 | 3/2004 |

OTHER PUBLICATIONS

International Search Report in related application No. PCT/SE2009/050577, dated Aug. 10, 2009.

* cited by examiner

*Primary Examiner*—John B Sotomayor
(74) *Attorney, Agent, or Firm*—Westman, Champlin & Kelly, P.A.

(57) ABSTRACT

A radar level gauging system for determining a filling level of a product contained in a tank by transmitting and receiving microwave signals over at least two functionally independent channels. Each channel has an electronics unit with transceiver circuitry arranged on a printed circuit board and processing circuitry connected to the transceiver circuitry for determining the filling level based on a relation between transmitted signals and received signals, and each electronics unit is electronically and galvanically separated from other electronics units. The system further comprises a single antenna for emitting microwave signals into the tank, and a hollow waveguide for guiding microwave signals between each transceiver circuitry and the antenna. Each electronics unit further comprises feeding circuitry arranged on the printed circuit board, the feeding circuitry comprising at least one feeding probe protruding into the waveguide for feeding the microwave signals into the waveguide.

The present invention enables a very simple, cost-effective and reliable feeding for each channel.

15 Claims, 3 Drawing Sheets

MULTI-CHANNEL RADAR LEVEL GAUGE SYSTEM

FIELD OF THE INVENTION

The present invention relates to a radar level gauging system for determining a filling level of a filling material contained in a container by transmitting and receiving microwave signals over at least two separate and functionally independent channels, wherein the signals of said channels are distinguishable by a detectable characteristic for each channel, as well as to a corresponding method for determining such a filling level.

BACKGROUND OF THE INVENTION

Radar level gauging (RLG) to measure the level of a filling material, such as a liquid or a solid like a granulate is an increasingly important method for level gauging in tanks, containers, etc. Many different types of RLG systems are previously known. An example of such a systems is disclosed in U.S. Pat. No. 7,106,247 by the same applicant.

For many applications, such as for instance in radar level gauging systems for a tanker's load containers, at least one overfill alarm that is functionally independent of the level measuring system is required. Functional independence here means that a fault in one system does not render the other system(s) inoperative. Such independence can be achieved by ensuring that there is no common electrical circuits and cabling, i.e. there must not be any galvanic contact between different measuring systems. However, fixed mechanical constructions for example, which cannot normally go wrong, may be shared. Thus, due to safety restrictions, environmental laws and requirements, etc, there is often a need for several measurements of the surface level of the medium in the container, which measurements are completely separated and independent from each other. The user further may want redundancy in measured values which may require more than one installed measurement system, which may require at least two complete independent level gauges.

Several such radar level gauging system providing two or more functionally independent channels are previously known. For example, U.S. Pat. No. 6,414,625 by the same applicant discloses a device and a method for measuring the level of the surface of a filling material in a container involving more than one radar channel for obtaining a measured value of said level, where the level values measured in said channels are obtained independently of each other. This is accomplished by use of at least two microwave signals distributed in separate channels fed to the same antenna unit, whereby the at least two signals are used to measure the level independently of each other. Said microwave signals are distinguished by means of a detectable characteristic.

A further example of such a system using several channels for feeding one and the same antenna is disclosed in WO 03/025523, also by the same applicant. In this system, the gauging system comprises a feeding mans, which has two or more wave guide members for forwarding the wave guide signals to and from the antenna.

Independent radar level gauges using the same physical antenna but otherwise electrically independent have found use for redundancy at a low cost. The method to connect more than one sensor to one antenna is a very cost effective way to implement e.g. a system with a level sensor and an independent overfill alarm, etc, and has gained wide acceptance among users and authorities. However, previously known systems of this type typically requires complex feedings arrangements, involving complex combiners, couplers and the like, and are therefore relatively complex and costly. Further, these known systems are also impaired by relatively large signal and measurement errors.

For example, the above-discussed system disclosed in WO 03/025523 uses an old turn-style junction as the coupling device to connect the sensors to the antenna, with a coaxial cable to each sensor. The coaxial connectors have due to their design and specifications a rather high VSWR (Voltage Standing Wave Ratio) which introduces an off-set error which is difficult to predict, and in addition the coaxial cables introduce an internal length which will add near-zone errors. Especially for frequencies where standard SMA (SubMiniature version A) connectors cannot be used, typically for frequencies above 18 GHz, the additional cost is also not negligible and the VSWR is bigger.

There is therefore a need for an improved RLG system with two or more independent radar level gauges using the same physical antenna.

GENERAL DISCLOSURE OF THE INVENTION

It is therefore an object of the present invention to provide an improved radar level gauging system which eliminate or at least alleviate the above-discussed problems of the prior art.

According to a first aspect of the present invention this object is achieved by a radar level gauging system for determining a filling level of a filling material contained in a container by transmitting and receiving microwave signals over at least two separate and functionally independent channels, wherein signals of different channels are distinguishable by the radar level gauge system. The system comprises for each channel, an electronics unit including transceiver circuitry arranged on a printed circuit board for transmitting and receiving the distinguishable signals, and processing circuitry connected to the transceiver circuitry for determining the filling level based on a relation between transmitted signals and received signals, wherein each electronics unit is electronically and galvanically separated from other electronics units. The system further comprises a single antenna for emitting microwave signals transmitted from each transceiver circuitry towards a surface of the product and for receiving echo signals resulting from reflections at impedance transitions encountered by the transmitted microwave signals, including a surface echo signal resulting from reflection at the surface; a hollow waveguide for guiding microwave signals between the each transceiver circuitry and the antenna; each electronics unit further comprising feeding circuitry arranged on the printed circuit board, the feeding circuitry comprising at least one feeding probe protruding into the waveguide for feeding the microwave signals into the waveguide.

The transceiver circuitry and feeding circuitry of a particular channel are thus arranged on the same printed circuit board. The concentration of the feeding arrangement to PCBs enables better performance (insulation and matching) than known prior art solutions, and is relatively cost-effective and simple to produce. Thus, the collection of all critical microwave functions for each channel to one PCB is a very cost effective solution. Further, the present invention enables a very short microwave path from the TX/RX-modules to the antenna, which e.g. is an important property for good measuring performance at small distances.

The word separate should here be understood to mean that the electronic units 3a, 3b are electrically separated and isolated from each other. Optionally, the electronic units are also formed as physically individual units, that are individually mounted to the system.

By "hollow" waveguide is intended a waveguide where the conducting material encloses a hollow space, which can be empty or filled with a suitable dielectric material. The hollow waveguide can be tubular with a suitable cross section, and in a preferred embodiment it has a circular cross section.

The present invention enables provision of two or more functionally independent channels. Functional independence here means that a fault in one channel should not make another channel inoperable, so that a level measurement may still be performed in the other channel. Here, functional independence is ensured by separating the channels galvanically and electrically. A channel is here characterized as all the electronics, including microwave transmitter and receiver, that is needed to generate, transmit, distribute and receive the microwave signals up to the microwave waveguide. The microwave signals used in the separate channels are distinguishable. This may be arranged by generating microwave signals for the different channels to have, for example, different polarization, different modulation, different frequencies or being separated in time.

At the same time, the present invention enables a very simple, cost-effective and reliable feeding for each channel. In particular, much lower VSWR (Voltage Standing Wave Ratio) and reduced off-set error levels are obtained, compared to the previously known systems using coaxial cables and turn-style junctions, and the inventive system may be used with essentially all frequencies conventionally used for RLG. Thus, the arrangement of the present invention provides a cost-efficient and effective solution for attaining the functional independence of the channels.

Further, since the accuracy of a radar system depends on a straight signal path without internal reflections, the system according to this aspect of the present invention also provides an improved accuracy. Hereby, offset errors and near-zone errors will be reduced.

The electronics units are preferably arranged so as to surround the hollow waveguide and to define an opening through which the hollow waveguide extends. Each electronics unit may further comprise a conducting wall portion through which the at least one probe extends, and the electronics units are then preferably arranged such that the wall portions combine to form a rim surrounding the opening and forming a section of the hollow waveguide. The feeding units thus become an intermediate section of the waveguide.

BRIEF DESCRIPTION OF THE DRAWINGS

For exemplifying purposes, the invention will be described in closer detail in the following with reference to embodiments thereof illustrated in the attached drawings.

DESCRIPTION OF PREFERRED EMBODIMENTS

Figure 1:
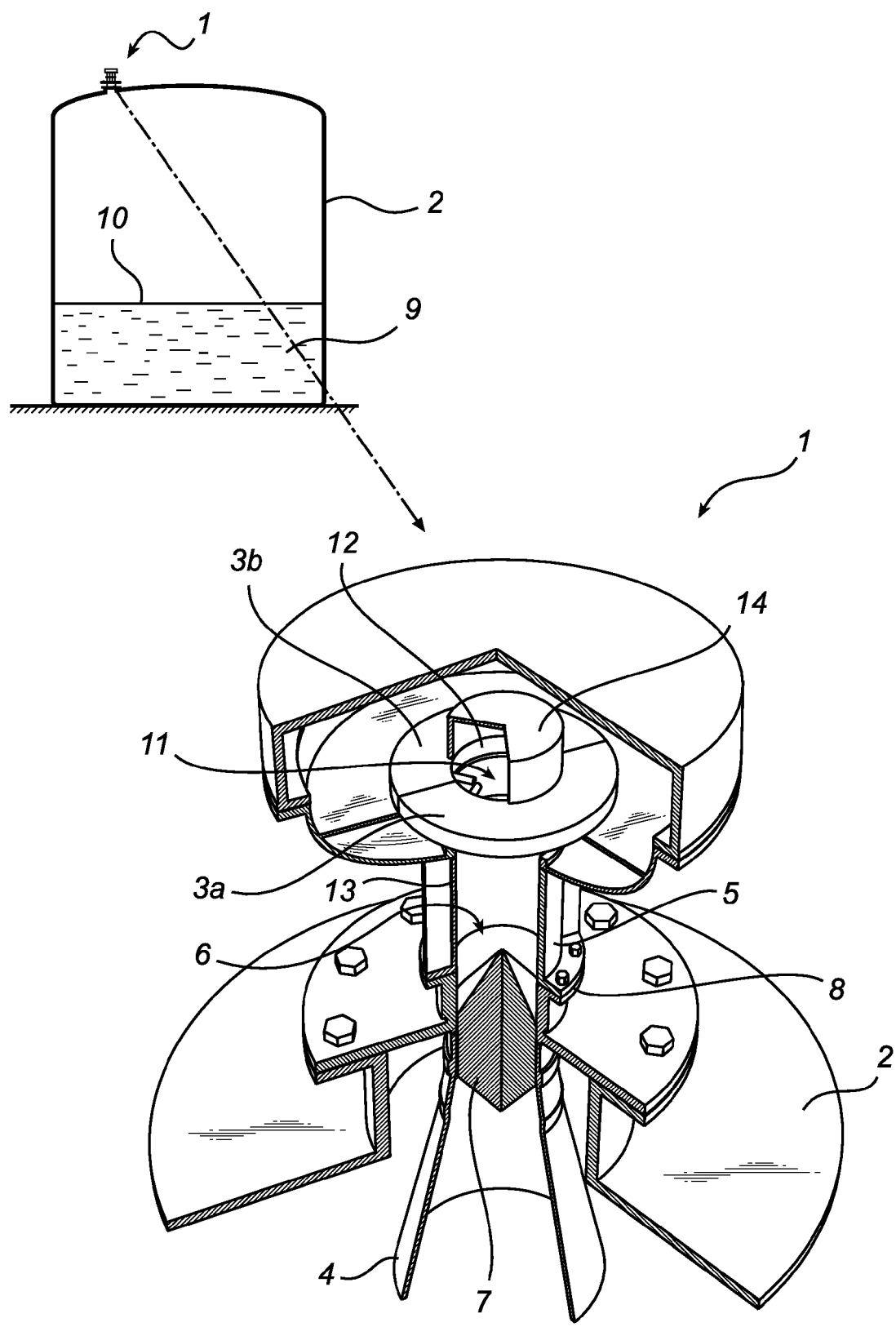
FIG. 1 is a schematic view of a tank provided with a radar level gauging system according to an embodiment of the invention.

FIG. 1 shows schematically a radar level gauging system 1 according to an embodiment of the present invention, mounted to the roof of a tank 2.

In brief, the system in FIG. 1 is an exemplary radar level gauging system for determining a filling level L of a filling material 9 contained in the tank 2 by transmitting and receiving microwave signals over at least two separate and functionally independent channels, wherein the signals of the channels are distinguishable by a detectable characteristic for each channel. The filling material may be products such as oil, refined products, chemicals and liquid gas, or may be a solid material in powder or granular form, such as grain, pellets or coal. The tank 2 may be stationary or arranged on a moving vehicle, such as on a tanker.

The radar level gauging system 1 comprises at least two electronics units 3a, 3b comprising transceiver circuitry 31, 32 (see FIG. 2) for transmitting and receiving radar signals in the at least two different measuring channels. The system further comprises processing circuitry 33 for determining the filling level of the container based on received signals reflected from the filling material. Further, the system comprises an antenna 4 arranged inside the container for transmitting and receiving radar waves into the tank 2 and a hollow waveguide assembly 5 for guiding signals between the electronics units 3a, 3b and the antenna 4. The hollow waveguide 5 is preferably a tubular waveguide having a 90-degree symmetrical cross-section, e.g. an essentially circular cross-section. The same antenna 4 is used for both channels, and both as a transmitter for emitting the output radiation and as a receiver for receiving the reflected echo signals.

The radar level gauge is preferably arranged outside the tank 2, and the waveguide 5 is then arranged to protrude into the container through a hole 6 in the container wall. If required, the container is provided with a sealing 7, arranged to allow the electromagnetic signals to pass through the wall of the container while maintaining an air tight seal, so as to prevent container contents from escaping from the container.

The two measuring channels are functionally independent, for the provision of independent or redundant level gauging. The circuitry in the channels are therefore galvanically isolated, i.e. electrically isolated from one another in DC terms, from processing units of the other channels. Such systems are per se previously known from the above-discussed documents WO 03/025523 and U.S. Pat. No. 6,414,625 by the same applicant, both of which are hereby incorporated by reference.

As the different channels share the same antenna 4, it is important to ensure that radar waves transmitted one channel are not received by another measuring channel. For this purpose, the radar waves from each channel are distinguishable from each other, e.g. by means of different polarization, different modulation, different frequency, or suitable time separation. Preferably, the microwave signals in the different channels have different and essentially orthogonal polarizations, such as essentially orthogonal linear or circular polarizations.

The antenna 4 is here illustrated as a horn antenna. However, other types of aerials or antennas can be used as well, such as a fixed or movable parabolic antenna, a conical antenna, a transmission line or a straight tube aerial. The antenna may be sealed by a dielectric material 7 filling at least part of the waveguide. Further, there may be provided a waveguide joint 8, enabling the enclosed electronics units to be detached from and attached to the antenna under maintained sealing of the tank.

In use, the transceiver circuitries 31, 32 transmit microwave signals along the waveguide 5 through the container roof to the antenna 4, which emits it into the tank. The microwave signals propagate into the tank 2 and are reflected by impedance transitions present in the tank. In particular, the microwaves are reflected by the surface 10 of the material 9 in the tank. The reflected microwaves, including any surface echo, is received by the antenna, and guided by the waveguide to the transceiver circuitry 31, 32. The processing circuitry determines the distance to the surface 10 based on transmitted and reflected signals. The received signals can be processed by a processor with software for analyzing the signals in order to determine the filling level, and the processor is preferably a microprocessor based circuit. The functions and algorithms implemented by the signal processor, some of which can be embodied in hardware and some of which can be embodied in software, are per se known from the art will not be discussed further in this application. The radar level gauge system could be coupled to a remote location (for example a control room) via a signal wire or the like.

Various radar principles may be employed for the radar level gauge. One of these is the impulse delay method (pulse radar method), another is the frequency modulated continuous wave (FMCW) radar method. In the FMCW radar method, the delay is determined in an indirect manner by transmitting a frequency modulated signal and creating a difference between the transmitted and the received momentary frequency. The pulse radar method, on the other hand, uses the radiation of short microwave pulses, also known as bursts, wherein the direct time duration is determined between the transmission and the reception of the individual pulses. The system may use pulsed or continuously emitted radiation. In case pulsed signals are used, the signals can be DC pulses with a length of about 2 ns or less, with a frequency in the order of MHz, at average power levels in the nW or μW area. Alternatively, the pulses are modulated on a carrier wave of a GHz frequency.

According to an embodiment of the present invention, each channel is provided with an electronic unit 3a, 3b, and these units are separate from each other. In the illustrated example, the electronics units 3a, 3b are formed as physically separate units.

Figure 2:
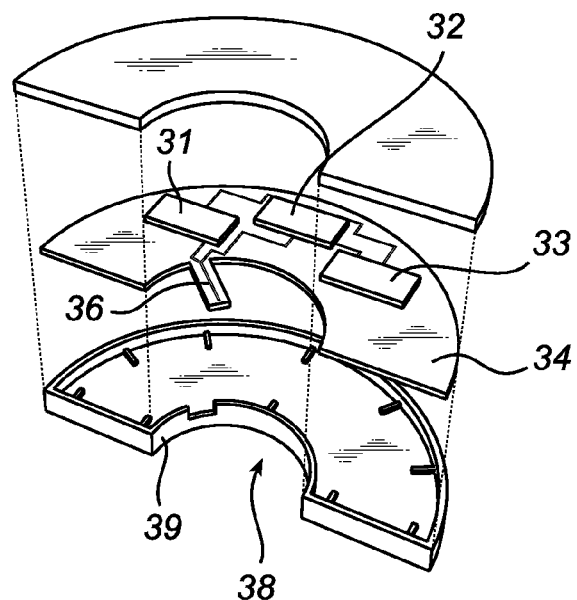
FIG. 2 is a partly broken away perspective view of an electronic unit in the radar level gauge system in FIG. 1.

The electronics units 3a, 3b are shown in more detail in FIG. 2. Each electronics units comprises a printed circuit board (PCB) 34, on which the transceiver circuitry 31, 32 is mounted. Alternatively e.g. a piece of flexible card or molded plastic part with metallic conductors, sometimes referred to as "3D PCB", could be used to connect an ordinary PCB comprising the circuits with the waveguide. The transceiver circuitry here comprises a microwave generating unit (transmitter) 31 and a microwave receiving unit (receiver) 32. The transmitter and receiver may be separate units, or an integrated transceiver.

The circuit board 34 and any circuitry mounted thereon is enclosed by an enclosure, e.g. in the form of a conductive casing 35 and a lid 41. A conductive casing 35 provides electromagnetic shielding of the circuitry, as well as physical protection. A conductive casing must be electrically isolated from the circuitry in the electronics unit.

Feeding circuitry comprising a feeding probe 36 is further mounted on the circuit board 34 and protrudes through the enclosure into the waveguide 5. According to the embodiment illustrated in FIG. 2, the printed circuit board 34 extends through the enclosure 35, and the probe 36 is a conducting pattern on the printed circuit board itself. In order to isolate the probe 36 from a conductive casing 35, the hole in the enclosure can simply be larger than the probe 36. Alternatively, the probe 36 can be formed with a dielectric sleeve 37, in a similar fashion as a coaxial lead. The parts of the feeding probes 36 protruding into the waveguide preferably comprise essentially straight conducting elements, directed towards the center of the waveguide 5.

Thus, the entire microwave circuit arrangement of each electronics unit is arranged on a single printed circuit board (PCB). The microwave circuit arrangement comprises the feeding probes 36, to be arranged in the waveguide 5, the microwave generating units 31, or corresponding microwave input ports to be connected to a microwave generating unit, the microwave receiving units 32, or corresponding output ports to be connected t a microwave receiving unit, and preferably also coupling circuitry (not shown) for transferring and feeding signals between the microwave generating unit and the feeding probes, and between the microwave receiving unit and the feeding probes, respectively.

The microwave generating units 31, generally referred to as transmitting units (TX), are adapted to generate a microwave signal to be used for pulsed radar level measurement or FMCW, as is per se well known in the art. The microwave generating units 31 may be implemented on the PCBs. However, as an alternative a microwave input port may be arranged on the PCBs, to be connected to an external microwave generating unit 31.

The microwave receiving units 32, generally referred to as receiving unit (RX), are adapted to receive and process wave signals radiated by the antenna 4 and reflected by the surface of the filling material. The microwave receiving units 32 can e.g. include circuits to carry out amplification, frequency conversion, filtering, demodulation or signal compression, as is per se well known in the art.

The processing circuitry 33 of each channel is preferably also arranged in the electronics unit 3a, 3b. In that case it may be arranged on the same circuit board 34, or on a second circuit board (not shown) within the enclosure 35.

The electronics units 3a, 3b are preferably arranged adjacent each other in a plane essentially perpendicular to the waveguide 5, and arranged on opposing sides of the hollow waveguide 5, so as to surround the hollow waveguide and to define an opening 11 through which the hollow waveguide extends. For this purpose the electronics units 3a, 3b may be formed with indentations 38 that when combined form the opening 11 corresponding to the waveguide cross section, and the feeding probes 36 may protrude into these indentations 38. In case of a waveguide with a circular cross section, the electronics units 3a, 3b are preferably provided with semi-circular indentations 38 that form a circular opening. As shown in FIG. 2, each unit may form a section of an annular disc.

When two or more electronics units 3a, 3b are thus combined to form an opening 11 with the same cross section as the waveguide 5, the inner walls 39 of these electronics units may serve as a section 12 of the waveguide. In this case, at least the portion of the casing 35 forming the inner walls must be conducting. This waveguide section 12 may then be connected to a lower waveguide portion 13, connected to the antenna 4. Above the electronics units 3a, 3b a cap 14 may be arranged to cover the waveguide section 12, and to provide a closure of the waveguide, whereby the waveguide is short-circuited. The electronics units 3a, 3b and the cap 14 may be fixated to the lower waveguide 13 by means of screws or other fastening devices (not shown), and thereby be pressed together for form a continuous circular waveguide.

The electronics units 3a, 3b can be essentially identical in design, to facilitate manufacturing, and may be oriented differently in relation to each other and in relation to the waveguide. In particular, the units may be oriented such that the probes are arranged orthogonally with respect to each other. Such an arrangement of the probes will be beneficial if channels with orthogonal polarization are desired.

Figure 3A:
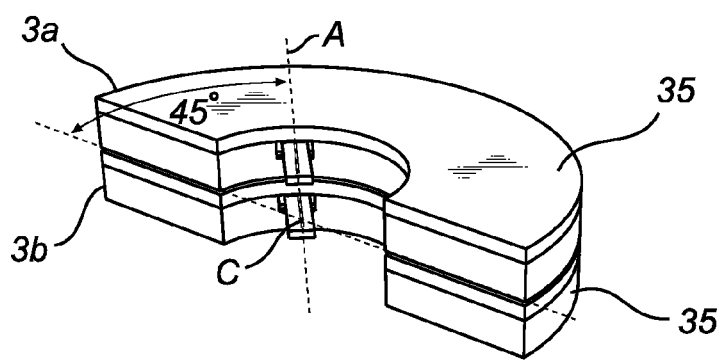
FIGS. 3a and 3b illustrate the orientation of two identical electronics units according to an embodiment of the invention.
Figure 3B:
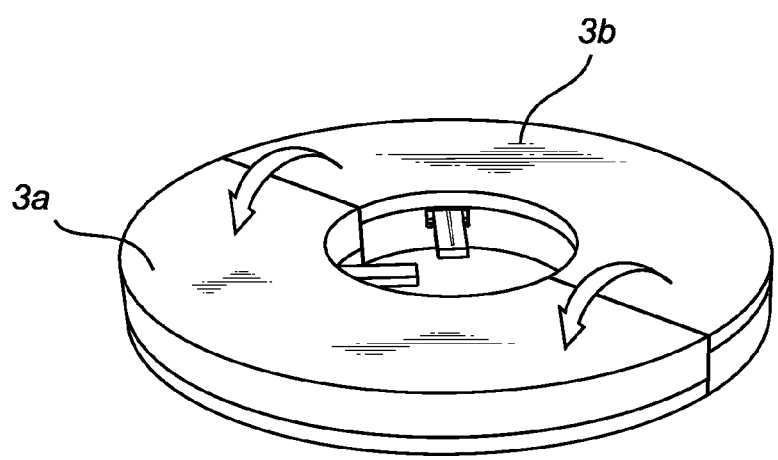

According to one embodiment, two identical electronics units may be rotated 180 degrees in relation to each other around a horizontal axis. Preferably, the probe 36 of each unit is arranged to extend in a direction A forming an angle of 45 degrees with respect to the horizontal axis. After rotation, the two probes will then be arranged orthogonally with respect to each other. As illustrated in FIGS. 3a and 3b, in the case of two semi-annular disc-shaped units, one unit 3a is flipped upside down over the center C of the waveguide.

Figure 4A:
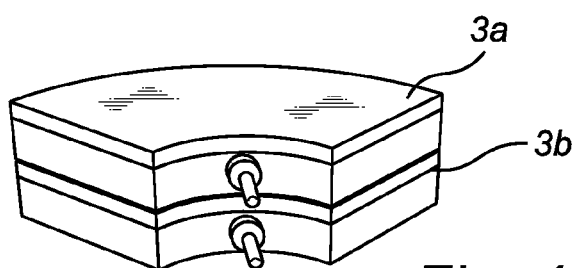
FIGS. 4a and 4b illustrate the orientation of two identical electronics units according to an embodiment of the invention and a semi-annular disc.
Figure 4B:
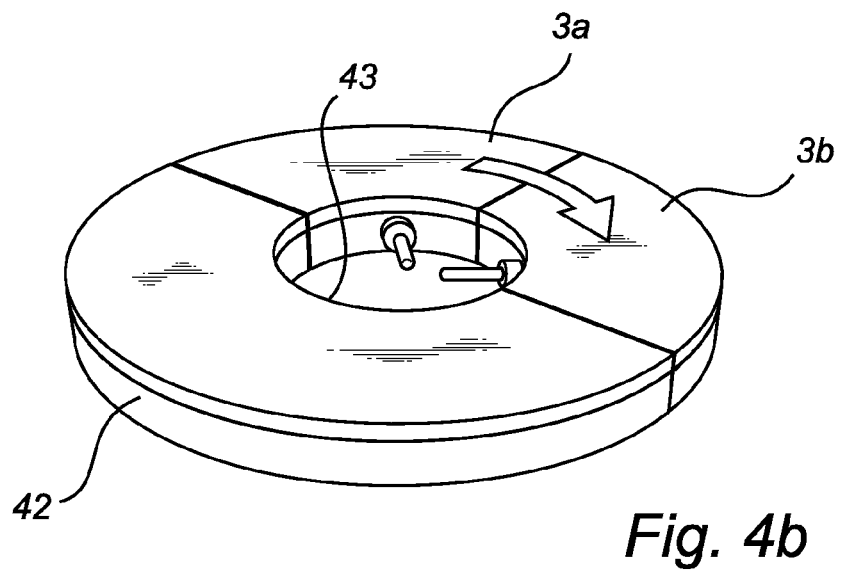

According to another embodiment, identical two identical electronics units may be rotated 90 degrees in relation to each other around a vertical axis. After rotation, the two probes will again be arranged orthogonally with respect to each other. As illustrated in FIGS. 4a and 4b, in the case of two quarter-annular disc-shaped units, one unit 3a is turned 90 degrees around the center C of the waveguide. In this case, a semi-annular disc 42 is arranged to interact with the two electronics units in order to surround the waveguide. The dummy can be made of metal or plastic, in the latter case with a conducting inner wall 43.

It is possible to have two or more probes on each feeding circuitry, i.e. on each PCB, in order to enable circular polarization. Hereby, and by the turning one of the PCBs upside down as described above, each feeding circuitry will transmit in different circular polarization (right-hand circular polarization, RHCP, and left-hand circular polarization, LHCP).

In case the RLG system occasionally is to be used with only one channel, a dummy may be used instead of one of the PCBs, such as a semicircular piece of metal giving a mechanical fit and a smooth waveguide.

Further, more than two channels may be provided. For example, the ring-like shape formed by the electronics units in FIG. 1 may be divided into three or more separate units instead of only two. Further, it is possible to replace the cap 12 by a waveguide termination.

It will be appreciated that several different measuring and alarm alternatives can be provided using one or more additional measuring channels. For example, a measurement can be carried out using one extra radar measuring channel, which measurement is redundant to a level measurement carried out using a first measuring channel. If the measuring values from both measuring channels lie within predetermined tolerance values, it can hereby be verified with a very high degree of probability that the level value measured is correct. Alternatively, a high level alarm can be obtained with the extra measuring channel in the form of an alarm at a maximum permitted level or an overfill alarm. For example, the channels may be used for realization of two or more independent level sensing functions in the way discussed in WO 2004/018978 by the same applicant, said document hereby being incorporated by reference. The independent level sensing functions may e.g. be two or more of 1. Level gauging sensor for measuring at all levels.
2. High level alarm.
3. Overfill control, e.g. comprising an overfill alarm system The measuring signals from one or both of the above-discussed channels may hereby be used to activate one or several alarm(s). The alarming units can be designed in several ways to alert an operator about the current situation. As some examples: an acoustic signal can be activated, alarming lamps can start to light or twinkle or some kind of signaling can be activated on a control board, alarms on a computer screen or a remote unit (phone, minicall, radio etc.) are activated. The alarm is e.g. set to be activated in dependence of the level of the surface. At a certain value, a threshold value of the level, the alarming unit is activated.

For redundancy purposes, the measuring signals output from the different channels, where said signals contain information about the level of the surface of the product independently of each other, may be used for determination of a mean value or a median value of said level.

It is to be appreciated by those skilled in the art that various combinations of the above-discussed embodiments and specific features of the disclosed antenna are possible. The present invention may be used for realizing level measurement-alarm indication for a tanker's load containers (tanks), but it is evident that the invention can be used for all types of liquids and bulk material, and for any type of system requiring independent measuring channels.

Specific embodiments of the invention have now been described. However, several alternatives are possible, as would be apparent for someone skilled in the art. For example, more than two channels may be provided, different types of waveguides and antennas may be used, etc. Such and other obvious modifications must be considered to be within the scope of the present invention, as it is defined by the appended claims.

What is claimed is:

1. A radar level gauging system for determining a filling level of a product contained in a tank by transmitting and receiving microwave signals over at least two functionally independent channels, wherein signals of different channels are distinguishable by the radar level gauging system, said system comprising:

for each channel, an electronics unit including transceiver circuitry arranged on a printed circuit board for transmitting and receiving said distinguishable signals, and processing circuitry connected to said transceiver circuitry for determining the filling level based on a relation between transmitted signals and received signals;

each electronics unit being electronically and galvanically separated from other electronics units;

a single antenna for emitting microwave signals transmitted from each transceiver circuitry towards a surface of said product and for receiving echo signals resulting from reflections at impedance transitions encountered by the transmitted microwave signals, including a surface echo signal resulting from reflection at said surface;

a single hollow waveguide for guiding microwave signals between each transceiver circuitry and said antenna; and each electronics unit further comprising feeding circuitry arranged on said printed circuit board, said feeding circuitry comprising at least one feeding probe protruding without the means of cables into said single waveguide through a sidewall thereof for feeding said microwave signals into said single waveguide.

2. The radar level gauging system of claim 1, wherein the electronics units are arranged so as to surround said hollow waveguide and to define an opening through which said hollow waveguide extends.

3. The radar level gauging system of claim 2, wherein said hollow waveguide has a circular cross section, and each electronics unit forms a section of an annular disc defining a circular opening.

4. The radar level gauging system of claim 2, wherein each electronics unit further comprises a conducting wall portion through which said at least one feeding probe extends, and wherein the electronics units are arranged such that the wall portions combine to form a rim surrounding said opening and forming a section of the hollow waveguide.

5. The radar level gauging system of claim 4, wherein the conducting wall portion is a part of an enclosure enclosing the electronics unit.

6. The radar level gauging system of claim 1, wherein said electronics units are physically separated from each other, and have an essentially identical geometrical design.

7. The radar level gauging system of claim 6, wherein a first and a second electronics unit are arranged in relation to each other such that the probe of the first electronics unit and the probe of the second electronics unit are oriented such that microwave signals fed by said probes have different and essentially orthogonal polarizations in the waveguide.

8. The radar level gauging system of claim 7, wherein said first and second electronics units are rotated in relation to each other 180 degrees around a horizontal axis.

9. The radar level gauging system of claim 8, wherein the probe of each electronics unit forms an angle of 45 degrees with respect to said horizontal axis.

10. The radar level gauging system of claim 7, wherein said first and second electronics units are rotated in relation to each other 90 degrees around a vertical axis.

11. The radar level gauging system of claim 1, wherein the processing circuitry of a particular channel is arranged on the printed circuit board of the electronics unit of said particular channel.

12. The radar level gauging system of claim 1, wherein the antenna is a horn antenna connected to the hollow waveguide, and wherein said radar level gauging system further comprises a dielectric sealing element arranged to seal the interior of the hollow waveguide from material contained in the tank.

13. The radar level gauging system of claim 1, wherein at least one of said channels comprises an alarm unit, arranged to generate an alarm signal if the processing circuitry of said channel determines that the filling level exceeds a predefined threshold level, said threshold level being one of a high level alarm level and an overfill alarm level.

14. The radar level gauging system of claim 1, wherein said transceiver circuitry and feeding circuitry in the different channels are arranged to transmit and receive microwave signals that are distinguishable by means of at least one of polarization; modulation; frequency; and time separation.

15. The radar level gauging system of claim 1, wherein the probes of each feeding circuitry are oriented such that microwave signals fed by said probes have different and essentially orthogonal polarizations in the waveguide.

* * * * *